United States Patent
De Dios Martín

(10) Patent No.: US 12,206,205 B2
(45) Date of Patent: *Jan. 21, 2025

(54) COVER ASSEMBLY FOR A TELECOMMUNICATIONS CONNECTOR

(71) Applicant: CommScope Connectivity Spain, S.L., Madrid (ES)

(72) Inventor: Longinos De Dios Martín, Barcelona (ES)

(73) Assignee: CommScope Connectivity Spain, S.L., Madrid (ES)

( * ) Notice: Subject to any disclaimer, the term of this patent is extended or adjusted under 35 U.S.C. 154(b) by 880 days.

This patent is subject to a terminal disclaimer.

(21) Appl. No.: 17/206,960

(22) Filed: Mar. 19, 2021

(65) Prior Publication Data

US 2021/0281009 A1    Sep. 9, 2021

Related U.S. Application Data

(63) Continuation of application No. 16/727,412, filed on Dec. 26, 2019, now Pat. No. 10,958,012, which is a
(Continued)

(30) Foreign Application Priority Data

Mar. 27, 2015 (ES) .............................. ES201530418

(51) Int. Cl.
  *H01R 13/52*   (2006.01)
  *H01R 13/447*  (2006.01)
  (Continued)

(52) U.S. Cl.
  CPC ....... *H01R 13/5213* (2013.01); *H01R 13/447* (2013.01); *H02G 3/14* (2013.01);
  (Continued)

(58) Field of Classification Search
  CPC .................................................. H01R 13/5213
  See application file for complete search history.

(56) References Cited

U.S. PATENT DOCUMENTS

| 3,666,996 A | 5/1972 | Brown |
| 3,739,076 A | 6/1973 | Schwartz |

(Continued)

FOREIGN PATENT DOCUMENTS

| CN | 101095264 A | 12/2007 |
| CN | 101510649 A | 8/2009 |

(Continued)

OTHER PUBLICATIONS

International Search Report and Written Opinion of the International Searching Authority for corresponding International Patent Application No. PCT/ES2016/070212 mailed Jun. 2, 2016, 10 pages.

(Continued)

*Primary Examiner* — James Harvey
(74) *Attorney, Agent, or Firm* — Merchant & Gould P.C.

(57) ABSTRACT

A cover assembly (100) is disclosed that can be installed onto and removed from a telecommunications connector (200) without requiring the connector (200) from being removed from its mounted position and without requiring an associated cover plate (120) from being removed from its mounted position. The cover assembly (100) can include a base portion (150) that defines an opening that entirely surrounds a cover portion (110). In one example, the cover portion (110) is attached to the base portion (150) via a living hinge (118). In one aspect, the base portion (150) acts as a color cap while the cover portion (110) acts as a dust cover. In example, the base portion (150) is provided without a cover portion (110) such that the cover assembly (100) simply acts as a color cap.

20 Claims, 12 Drawing Sheets

Related U.S. Application Data continuation of application No. 15/562,397, filed as application No. PCT/ES2016/070212 on Mar. 26, 2016, now Pat. No. 10,522,939.

(51) Int. Cl.
*H02G 3/14* (2006.01)
*B65D 85/00* (2006.01)
*H01R 13/46* (2006.01)
*H01R 13/50* (2006.01)
*H01R 13/74* (2006.01)
*H01R 24/64* (2011.01)
*H01R 107/00* (2006.01)

(52) U.S. Cl.
CPC ............ *B65D 85/00* (2013.01); *H01R 13/465* (2013.01); *H01R 13/501* (2013.01); *H01R 13/745* (2013.01); *H01R 24/64* (2013.01); *H01R 2107/00* (2013.01)

(56) References Cited

U.S. PATENT DOCUMENTS

| | | | |
|---|---|---|---|
| 3,830,957 A | 8/1974 | Oberdiear | |
| 4,284,316 A | 8/1981 | Debaigt | |
| 4,537,458 A | 8/1985 | Worth | |
| 4,660,912 A | 4/1987 | Tomek | |
| 4,679,879 A | 7/1987 | Triner et al. | |
| 4,721,476 A | 1/1988 | Zeliff et al. | |
| 4,747,785 A | 5/1988 | Roberts et al. | |
| 4,760,215 A | 7/1988 | Cook et al. | |
| 4,790,765 A | 12/1988 | Ehrenfels et al. | |
| 4,810,210 A | 3/1989 | Komatsu | |
| 4,824,400 A | 4/1989 | Spinner | |
| 4,830,628 A | 5/1989 | Dyson et al. | |
| 4,842,553 A | 6/1989 | Ingram | |
| 4,857,015 A | 8/1989 | Michaels et al. | |
| 5,021,610 A | 6/1991 | Roberts | |
| 5,169,346 A | 12/1992 | Johnston | |
| 5,238,416 A | 8/1993 | Dickie | |
| 5,240,436 A | 8/1993 | Bradley et al. | |
| 5,278,352 A | 1/1994 | Schade | |
| 5,310,359 A | 5/1994 | Chadbourne et al. | |
| 5,445,538 A | 8/1995 | Rodrigues et al. | |
| 5,571,023 A | 11/1996 | Anthony | |
| 5,637,002 A * | 6/1997 | Buck | H01R 13/443 |
| | | | 439/923 |
| 5,675,126 A | 10/1997 | Halvorsen | |
| 5,691,506 A | 11/1997 | Miyazaki et al. | |
| 5,697,806 A | 12/1997 | Whiteman, Jr. et al. | |
| 5,762,517 A | 6/1998 | Abe | |
| 5,769,647 A | 6/1998 | Tulley et al. | |
| 6,015,307 A | 1/2000 | Chiu et al. | |
| 6,077,122 A | 6/2000 | Elkhatib et al. | |
| 6,086,415 A | 7/2000 | Sanchez et al. | |
| 6,244,908 B1 | 6/2001 | Hammond et al. | |
| 6,247,849 B1 | 6/2001 | Liu | |
| 6,254,403 B1 | 7/2001 | Bernardini | |
| 6,292,564 B1 | 9/2001 | Cowan et al. | |
| 6,309,247 B1 * | 10/2001 | Wang | H01R 13/5213 |
| | | | 439/892 |
| 6,354,851 B1 | 3/2002 | Bachle | |
| 6,386,915 B1 | 5/2002 | Nelson | |
| 6,394,853 B1 | 5/2002 | Hammond et al. | |
| 6,425,694 B1 | 7/2002 | Szilagyi et al. | |
| 6,520,781 B2 | 2/2003 | Koide et al. | |
| 6,537,104 B1 | 3/2003 | Hagmann et al. | |
| 6,612,750 B1 | 9/2003 | Bull et al. | |
| 6,652,152 B2 | 11/2003 | Yang et al. | |
| 6,702,477 B1 | 3/2004 | Ngo | |
| 6,848,833 B1 | 2/2005 | Kamarauskas et al. | |
| 6,866,541 B2 | 3/2005 | Barker et al. | |
| 6,872,090 B2 | 3/2005 | De Dios Martin | |
| 7,029,182 B2 | 4/2006 | Ngo | |
| 7,033,219 B2 | 4/2006 | Gordon et al. | |
| 7,087,840 B2 | 8/2006 | Herring et al. | |
| 7,112,090 B2 | 9/2006 | Caveney et al. | |
| 7,156,696 B1 | 1/2007 | Montena | |
| 7,207,846 B2 | 4/2007 | Caveney et al. | |
| 7,220,145 B2 | 5/2007 | Denovich et al. | |
| 7,273,383 B1 | 9/2007 | Bennett | |
| 7,329,139 B2 | 2/2008 | Benham | |
| 7,340,146 B2 | 3/2008 | Lampert et al. | |
| 7,384,298 B2 | 6/2008 | Caveney et al. | |
| 7,416,448 B2 | 8/2008 | Gaidosch | |
| 7,476,120 B2 | 1/2009 | Patel et al. | |
| 7,510,421 B2 | 3/2009 | Fransen et al. | |
| 7,621,772 B1 | 11/2009 | Tobey | |
| 7,628,644 B1 | 12/2009 | Peluffo | |
| 7,628,657 B2 | 12/2009 | Martich | |
| 7,637,769 B2 | 12/2009 | Carreras Garcia et al. | |
| 7,645,160 B2 | 1/2010 | Tabet | |
| 7,676,133 B2 | 3/2010 | Lampert et al. | |
| 7,727,013 B1 | 6/2010 | Paynter | |
| 7,766,688 B2 | 8/2010 | Mateo Ferrus et al. | |
| 7,806,721 B2 | 10/2010 | Herndon et al. | |
| 7,819,698 B2 | 10/2010 | Islam | |
| 7,854,624 B1 | 12/2010 | Pepe | |
| 7,857,663 B2 | 12/2010 | Chantrell et al. | |
| 7,871,285 B1 | 1/2011 | Tobey et al. | |
| 7,874,865 B2 | 1/2011 | Tobey | |
| 7,909,622 B2 | 3/2011 | Pepe et al. | |
| 7,938,680 B1 | 5/2011 | Hsieh | |
| 7,955,120 B2 | 6/2011 | Patel et al. | |
| 8,057,249 B1 | 11/2011 | Tobey et al. | |
| 8,070,506 B2 | 12/2011 | De Dios Martin et al. | |
| 8,075,344 B2 | 12/2011 | Shih | |
| 8,109,784 B2 | 2/2012 | Patel et al. | |
| 8,241,055 B2 | 8/2012 | Chen | |
| 8,376,786 B2 | 2/2013 | Carreras Garcia et al. | |
| 8,454,383 B2 | 6/2013 | Paynter et al. | |
| 8,747,126 B2 | 6/2014 | Corbett et al. | |
| 8,758,065 B2 | 6/2014 | Fransen et al. | |
| 8,791,374 B1 | 7/2014 | Smith | |
| 8,834,196 B2 | 9/2014 | Duran et al. | |
| 9,022,792 B2 | 5/2015 | Sticker et al. | |
| 9,583,885 B2 | 2/2017 | Ruesca Fernandez | |
| 9,627,827 B2 | 4/2017 | Bragg | |
| 9,640,898 B1 | 5/2017 | Wubbels | |
| 9,768,556 B2 | 9/2017 | Bopp et al. | |
| 9,847,607 B2 | 12/2017 | Bopp et al. | |
| 10,476,212 B2 | 11/2019 | Bopp et al. | |
| 10,522,939 B2 | 12/2019 | De Dios Martin | |
| 10,594,088 B2 | 3/2020 | Cupples et al. | |
| 10,651,608 B2 | 5/2020 | White | |
| 10,777,953 B2 | 9/2020 | White et al. | |
| 10,784,640 B2 | 9/2020 | Font Aranega et al. | |
| 10,958,012 B2 | 3/2021 | De Dios Martin | |
| 2002/0052137 A1 * | 5/2002 | Hayashi | H01R 13/5213 |
| | | | 439/374 |
| 2002/0058432 A1 | 5/2002 | Chen et al. | |
| 2002/0119681 A1 | 8/2002 | Follingstad et al. | |
| 2003/0081907 A1 | 5/2003 | Malagrino, Jr. et al. | |
| 2004/0038582 A1 | 2/2004 | Clement | |
| 2004/0229501 A1 | 11/2004 | Caveney et al. | |
| 2005/0103672 A1 | 5/2005 | Peng | |
| 2005/0159036 A1 | 7/2005 | Caveney et al. | |
| 2005/0201071 A1 | 9/2005 | AbuGhazaleh et al. | |
| 2006/0110986 A1 | 5/2006 | King, Jr. et al. | |
| 2006/0204200 A1 | 9/2006 | Lampert et al. | |
| 2007/0054521 A1 | 3/2007 | John | |
| 2007/0240902 A1 | 10/2007 | Tapper | |
| 2008/0090461 A1 | 4/2008 | Pepe et al. | |
| 2008/0096438 A1 | 4/2008 | Clark et al. | |
| 2008/0102686 A1 | 5/2008 | Carreras Garcia et al. | |
| 2008/0268719 A1 | 10/2008 | Siemon et al. | |
| 2008/0311800 A1 | 12/2008 | Tsai Wu | |
| 2009/0004913 A1 | 1/2009 | Caveney et al. | |
| 2009/0034226 A1 | 2/2009 | Herndon et al. | |
| 2009/0243757 A1 | 10/2009 | Xu et al. | |
| 2009/0258545 A1 | 10/2009 | Pepe et al. | |
| 2009/0274422 A1 | 11/2009 | Henry et al. | |
| 2009/0311904 A1 | 12/2009 | Chen | |

(56) References Cited

U.S. PATENT DOCUMENTS

| | | |
|---|---|---|
| 2009/0318033 A1 | 12/2009 | Tobey |
| 2010/0151707 A1 | 6/2010 | AbuGhazaleh et al. |
| 2010/0216335 A1 | 8/2010 | Cobb |
| 2010/0255716 A1 | 10/2010 | Frey et al. |
| 2011/0030343 A1 | 2/2011 | Kiser et al. |
| 2011/0038581 A1 | 2/2011 | Mudd et al. |
| 2011/0097924 A1 | 4/2011 | Chen |
| 2011/0115494 A1 | 5/2011 | Taylor et al. |
| 2011/0304343 A1 | 12/2011 | Font Aranega et al. |
| 2012/0196472 A1 | 8/2012 | Fitzpatrick |
| 2012/0226807 A1 | 9/2012 | Panella et al. |
| 2012/0244736 A1 | 9/2012 | Duran et al. |
| 2012/0244752 A1 | 9/2012 | Patel et al. |
| 2012/0322307 A1 | 12/2012 | Kudo |
| 2013/0203291 A1 | 8/2013 | Sticker et al. |
| 2013/0210264 A1 | 8/2013 | Rynaski et al. |
| 2013/0217249 A1 | 8/2013 | Patel et al. |
| 2013/0255990 A1* | 10/2013 | Rothbauer ......... H01R 13/5213 174/67 |
| 2013/0260582 A1 | 10/2013 | White |
| 2014/0080354 A1 | 3/2014 | Caveney et al. |
| 2014/0242855 A1 | 8/2014 | Kan et al. |
| 2014/0287609 A1 | 9/2014 | Fransen et al. |
| 2014/0335726 A1 | 11/2014 | Zhang |
| 2015/0349468 A1 | 12/2015 | Singer et al. |
| 2016/0080836 A1 | 3/2016 | Carreras Garcia |
| 2016/0248197 A1 | 8/2016 | Fransen et al. |
| 2016/0285205 A1 | 9/2016 | Ruesca Fernandez |
| 2017/0229825 A1 | 8/2017 | Baines et al. |
| 2017/0302040 A1 | 10/2017 | Taylor et al. |
| 2018/0287312 A1 | 10/2018 | De Dios Martin et al. |
| 2018/0358739 A1 | 12/2018 | De Dios Martin |
| 2020/0137465 A1 | 4/2020 | White et al. |
| 2020/0244003 A1 | 7/2020 | De Dios Martin |
| 2020/0267862 A1 | 8/2020 | Taguchi et al. |
| 2020/0351573 A1 | 11/2020 | Shih |
| 2021/0104850 A1 | 4/2021 | White et al. |
| 2021/0143600 A1 | 5/2021 | Font Aranega et al. |

FOREIGN PATENT DOCUMENTS

| | | |
|---|---|---|
| CN | 201303074 Y | 9/2009 |
| CN | 201741918 U | 2/2011 |
| CN | 201774068 U | 3/2011 |
| CN | 202025948 U | 11/2011 |
| CN | 102957034 A | 3/2013 |
| CN | 203218574 U | 9/2013 |
| CN | 103384042 A | 11/2013 |
| DE | 101 13 230 A1 | 9/2002 |
| EP | 0 073 112 A1 | 3/1983 |
| EP | 0 775 845 A2 | 5/1997 |
| EP | 1 189 085 A2 | 3/2002 |
| EP | 1 422 793 A1 | 5/2004 |
| EP | 1 443 608 A2 | 8/2004 |
| EP | 1 484 824 A2 | 12/2004 |
| EP | 2 133 957 A1 | 12/2009 |
| ES | 2 178 813 T3 | 1/2003 |
| ES | 2 257 514 T3 | 8/2006 |
| ES | 1 138 538 U | 4/2015 |
| ES | 2 583 636 A1 | 9/2016 |
| ES | 2 584 539 A1 | 9/2016 |
| ES | 2 600 968 A1 | 2/2017 |
| FR | 2 701 007 A1 | 8/1994 |
| FR | 2 893 454 A1 | 5/2007 |
| GB | 221 872 | 9/1924 |
| GB | 2 260 660 A | 4/1993 |
| GB | 2 308 508 A | 6/1997 |
| GB | 2 457 982 A | 9/2009 |
| GB | 2 469 123 A | 10/2010 |
| JP | 2001-244029 A | 9/2001 |
| JP | 2006-126807 A | 5/2006 |
| JP | 2007-299620 A | 11/2007 |
| JP | 2007-313060 A | 12/2007 |
| JP | 2013-235783 A | 11/2013 |
| KR | 2001-0100594 A | 11/2001 |
| KR | 20-2010-0008888 U | 9/2010 |
| TW | M349117 U | 1/2009 |
| WO | 95/34923 A1 | 12/1995 |
| WO | 97/44862 A1 | 11/1997 |
| WO | 99/19944 A1 | 4/1999 |
| WO | 03/026076 A1 | 3/2003 |
| WO | 2005/104300 A1 | 11/2005 |
| WO | 2008/059203 A2 | 5/2008 |
| WO | 2008/095830 A1 | 8/2008 |
| WO | 2011/038387 A1 | 3/2011 |
| WO | 2013/090201 A1 | 6/2013 |
| WO | 2013/096279 A1 | 6/2013 |
| WO | 2013/123154 A1 | 8/2013 |
| WO | 2014/167449 A1 | 10/2014 |
| WO | 2016/151172 A1 | 9/2016 |
| WO | 2016/151177 A1 | 9/2016 |
| WO | 2016/156643 A1 | 10/2016 |
| WO | 2016/156644 A1 | 10/2016 |
| WO | 2018/009698 A1 | 1/2018 |
| WO | 2018/034870 A1 | 2/2018 |
| WO | 2018/236875 A1 | 12/2018 |
| WO | 2019/094558 A1 | 5/2019 |

OTHER PUBLICATIONS

Extended European Search Report for Application No. 18875839.5 mailed Jul. 19, 2021.
First Office Action for Chinese Patent Application No. 201880072621.7 mailed Aug. 17, 2021, 21 pages.
International Search Report and Written Opinion of the International Searching Authority for International Patent Application No. PCT/US2018/059780 mailed Mar. 4, 2019, 12 pages.
"Mini-Com All Metal Shielded Modular Patch Panels, Installation Instructions", Panduit, 2 pages (2010).
"Mini-Com® All Metal Shielded Modular Patch Panels, Installation Instructions, Specification Sheet", Panduit, 3 pages (2016).
Extended European Search Report for Application No. 17841856.2 mailed Feb. 19, 2020.
Extended European Search Report for Application No. 2017844.9 mailed Aug. 24, 2020.
Extended European Search Report for Application No. 18820793.0 mailed Feb. 12, 2021.
International Search Report and Written Opinion for Application No. PCT/ES2016/070204 mailed Jun. 6, 2016.
International Search Report and Written Opinion for Application No. PCT/ES2016/070213 mailed Jun. 7, 2016.
International Search Report and Written Opinion for Application No. PCT/ES2016/070190 mailed Jul. 5, 2016.
International Search Report and Written Opinion for Application No. PCT/EP2016/069310 mailed Oct. 14, 2016.
International Search Report and Written Opinion for Application No. PCT/US2017/040947 mailed Oct. 13, 2017.
International Search Report and Written Opinion for Application No. PCT/US2017/045539 mailed Nov. 15, 2017.
International Search Report and Written Opinion for Application No. PCT/US2018/038295 mailed Oct. 16, 2018.
Product Specifications: 1-1479191-3, SL Series Speaker Post Insert, red stripe, alpine white, CommScope, Inc., 1 page (Sep. 6, 2017).
State of the Art Report for Application No. 201530372 mailed Mar. 20, 2015.
State of the Art Report for Application No. 201530377 mailed Mar. 23, 2015.
State of the Art Report for Application No. 201530417 mailed Mar. 27, 2015.
State of the Art Report for Application No. 201530418 mailed Mar. 27, 2015.
State of the Art Report for Application No. 201530419 mailed Mar. 27, 2015.
State of the Art Report for Application No. 201531199 mailed Aug. 13, 2015.

* cited by examiner

COVER ASSEMBLY FOR A TELECOMMUNICATIONS CONNECTOR

CROSS-REFERENCE TO RELATED APPLICATION

This application is a Continuation of U.S. patent application Ser. No. 16/727,412, filed on Dec. 26, 2019, now U.S. Pat. No. 10,958,012, which is a Continuation of U.S. patent application Ser. No. 15/562,397, filed on Sep. 27, 2017, now U.S. Pat. No. 10,522,939, which is a National Stage Application of PCT/ES2016/070212, filed on Mar. 26, 2016, which claims the benefit of Spanish Patent Application No. P201530418, filed on Mar. 27, 2015, the disclosures of which are incorporated herein by reference in their entireties. To the extent appropriate, a claim of priority is made to each of the above disclosed applications.

TECHNICAL FIELD

The present disclosure relates to color caps attached to telecommunications connectors that include a dust caps for protecting an unused telecommunications connector.

BACKGROUND

Electrical connectors, for example RJ-type connectors, are useful for providing wall sockets where electronic data cables can be terminated and mating electrical plugs can be inserted. A problem with such electrical connectors can occur when dust, dirt or other contaminants come into contact with electrically conductive elements inside the connector. Such contaminants may cause corrosion, unintended conduction or adhesion of components that impedes their movement. Ingress of contaminants into the electrical connector may be particularly likely when the connector is placed in a wall cavity. This may be the case when building works generate abrasions and contaminants, for example.

Some electrical connectors, such as some RJ-type connectors, are assembled in such a way that an exposed cavity containing one or more conductive elements of the electrical connector is not covered once installed. This exposed cavity may be prone to accumulation of contaminants. It is generally desirable to overcome or ameliorate one or more of the above described difficulties, or at least provide a useful alternative.

Another concern regarding connectors is the provision of identification means on the connectors such that a user can more quickly identify an appropriate connector. Although some connectors are provided with color caps for this purpose, many are installed one the connector in such a way that their removal and replacement the field is difficult or impossible without removing the connector from its mounting location.

SUMMARY

A cover assembly is disclosed. The cover assembly is for covering a jack receptacle located at a front face of a telecommunications connector, the cover assembly includes: a base portion including at least one attachment feature for securing the base portion to the front face of the telecommunications connector, the base portion having a front face that defines an opening; a cover portion connected to the base portion via a living hinge, the cover portion being movable between a closed position and an open position: when the cover portion is in the closed position, a front face of the cover portion covers the opening and is coplanar with the front face of the base portion; when the cover portion is in the open position, the opening is at least partially uncovered by rotating the cover portion about the living hinge with the at least a portion of the base portion remaining unobscured by the cover portion.

A telecommunications system is disclosed. The system includes: a connector defining a jack receptacle located at a front face of the connector; a mounting panel to which the connector is mounted; a cover plate having a front face defining an opening, the cover plate being placed in a mounted position; a cover assembly removably secured to the connector and located at least partially within the covering plate opening. The cover assembly is similar to that as described above.

A method of attaching a cover assembly for a telecommunications jack is disclosed. The method can include the steps of: providing a connector defining a jack receptacle located at a front face of the connector; mounting the connector to a mounting panel; mounting a cover plate that has a front face defining an opening to a surrounding structure; providing a cover assembly of the type described above; and mounting the cover assembly to the connector.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
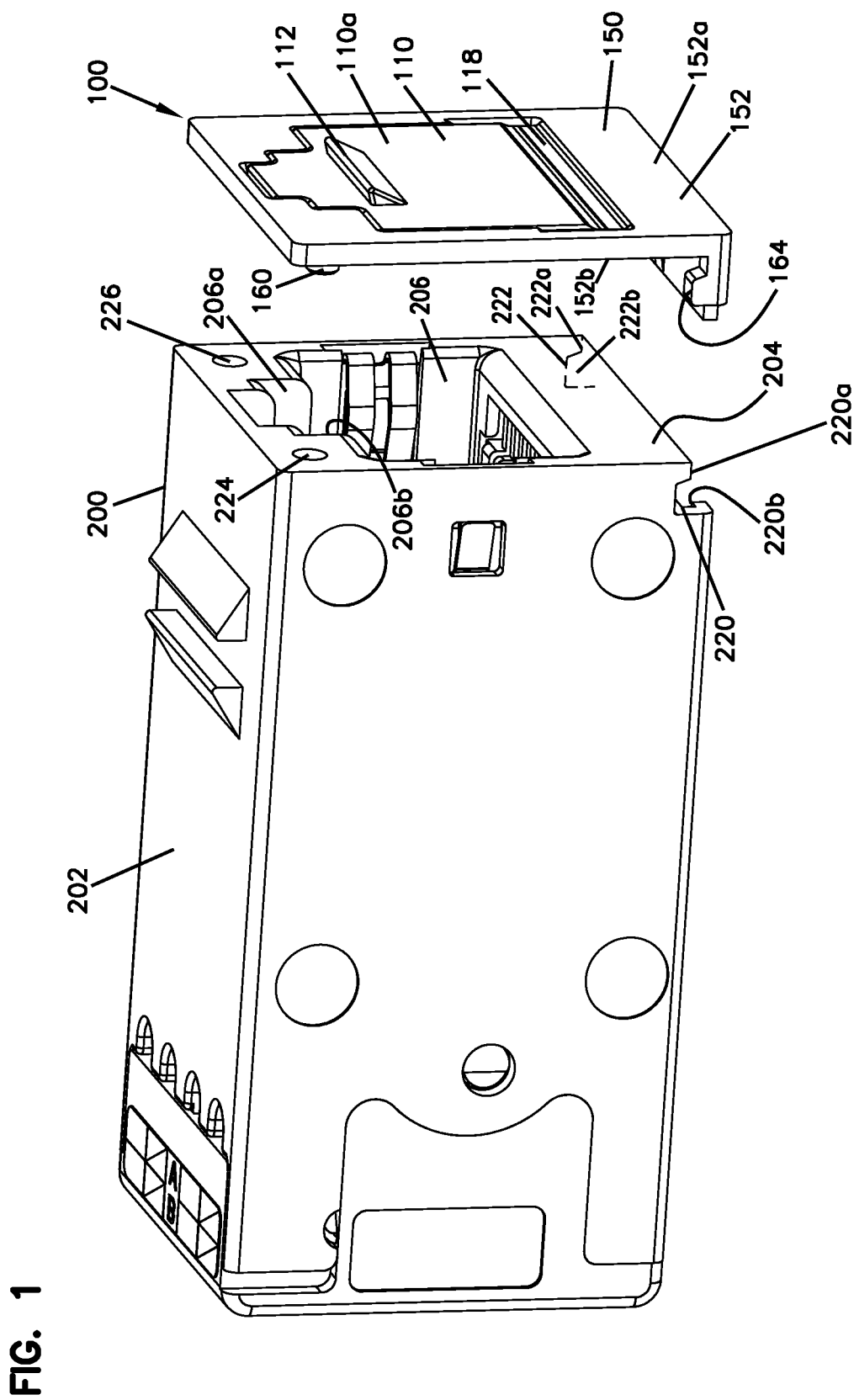
FIG. 1 is a front perspective view of a connector and a separated connector cover assembly having a color cap and a dust cap, the assembly having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1-4, an example cover assembly 100 is shown. Cover assembly 100 is for providing a visual port indication to identify they type of connector 200 (and/or type of service) to which the assembly 100 is attached. In this manner, an array of connectors 200 can be provided with differently colored cover assemblies 100 such that the purpose or identity of each connector can be easily understood by a user (e.g. a blue color cover 100 for a first data connector, a green color cover 100 for a second data connector, and a red color cover 100 for a telephone connector). Cover assembly 100 is also for protecting a jack receptacle 206 of the connector 200 from dust and other contaminants when the modular connector is not engaged with a plug 300. One type of modular connector suitable for use with cover assembly 100 is an RJ type connector, for example, an RJ45 type connector which can be connected to a cable 201. In one aspect, the jack receptacle 206 includes contact springs 208 on the inside of the jack for contacting a mating plug (not shown). One skilled in the art will appreciate that the cover assembly 100 may be used in conjunction with a wide variety of modular type connector jacks, for example fiber optic adapters. In the embodiment shown, cover assembly 100 includes a cover portion 110 rotatably connected to a base portion 150 via a living hinge 118 to open or close an opening 120 defined by the base portion that corresponds to the shape of the jack receptacle 206. As shown, the opening 120 is entirely circumscribed by the base portion 150 such that the opening 120 is an enclosed opening.

As most easily viewed at FIGS. 7 to 10, the cover portion 110 has a front face 110a and a rear face 110b. When the cover assembly 100 is mounted on a jack 200, the cover portion 110 is oriented such that the front face 110a is outward facing while the rear face 110b faces towards the jack receptacle 206 in a main body 202 of the jack 200. Located on the front face 110a of the cover portion 110 is a handle 112 configured to allow a user to manipulate the cover portion 110 such that the cover assembly 100 can be moved from a closed position to an open position. The cover assembly 100 is shown as being in the closed position at FIGS. 1, 2, 4, 5 and 9-10, and as being in an open position at FIGS. 3, 6, 7, and 8. In the example embodiment shown, the handle 112 is configured to allow this action to be initiated by using a single phalange (i.e. a finger and/or a fingernail).

As shown, the cover portion 110 and the base portion 150 are connected to each other by a living hinge 118. By use of the term "living hinge" it is meant to mean a relatively thin, flexible hinge made from the same material as the cover portion 110 and the base portion 150. This configuration allows for the cover assembly 100 to be produced in a single manufacturing step, as no assembly of the base portion 150 and the cover portion 110 is required.

In one aspect, the cover portion 110 is provided with one or more securing features 116 that engage with the interior surfaces of the jack receptacle 206. Securing feature 116 is for retaining the cover portion 110 in the closed position and may also act as an alignment guide when moving the cover portion 110 from the open to the closed position. The securing feature 116 has a width w1 such that, when the cover portion 110 is moved to the closed position, the ends of the securing feature 116 frictionally engage with side walls 206a and 206a of the jack receptacle 206. Additional or alternative securing features may be provided, for example, the securing features disclosed in United States patent application publication 2013/0260582, the entirety of which is incorporated by reference.

In one aspect, the base portion 150 includes a main body 152 having a front face 152a and a rear face 152b. When the cover portion 110 is in the closed position with respect to the base portion 150, the front face 152a is flush (i.e. coplanar) with and faces in the same direction as the front face 110a of the cover portion 110. In one aspect, attachment features can be provided on the rear face 152b to secure the cover assembly 100 to the front face 204 of the jack 200. Examples of suitable attachment features can be most easily seen at FIG. 10, wherein it can be seen that the rear face 152b is provided with a pair of protrusions 160, 162 and a pair of locking features 164, 166. The connector 200 can be provided with recesses 224, 226 which respectively receive protrusions 160, 162 and can be provided with locking features 220, 222 which respectively engage with the locking features 164, 166.

As shown, the locking features 164, 166 are respectively each provided with a lock portion 164a, 166a and a recess portion 164b, 166b while the locking features 220, 222 are respectively each provided with a complementarily shaped lock portion 220a, 222a and a recess portion 220b, 222b. When engaged, the lock portions 164a, 166a engage with the recess portions 220b, 222b while the lock portions 220a, 222a engage with the recess portions 164b, 166b. As such, the locking features 164/220, 166, 222 lock the cover assembly 100 to the connector 200 such that the cover assembly is constrained from moving horizontally away from the front face 204 proximate the engaged locking features 164/220, 166/222 and is constrained from moving vertically in a direction from the engaged locking features 164/220, 166/222 towards the jack receptacle 206. The protrusions 160, 162 frictionally engage with the recesses 224, 226 to prevent the cover assembly 100 from moving horizontally away from the front face 204 and also prevent the cover assembly 100 from moving in any direction parallel to the plane defined by the front face 204.

To install the base portion 150 onto the front face 204 of the connector 200, the locking features 164, 166 can be first engaged with the locking features 220, 222 on the connector main body 202 and the cover assembly 100 can be rotated about the engaged locking features 164/220 and 166/222 such that the protrusions 160, 162 are pressed into the recesses 224, 226 located on the front face 204 of the connector 200. In this position, the locking features 164/220 and 166/222 are unable to disengage as long as one or both of the protrusions 160, 162 are engaged with the recesses 224, 226. Removal of the cover assembly 100 is the reverse of installation, such that the base portion 150 must first be pulled away at the end opposite the locking features 164, 166 to pull the protrusions 160, 162 out of recesses 224, 226. Once this step is completed, the base portion 150 can then be displaced downwardly in a direction towards the locking features 164, 166 to release the locking features 164, 166 from locking features 220, 222.

Figure 2:
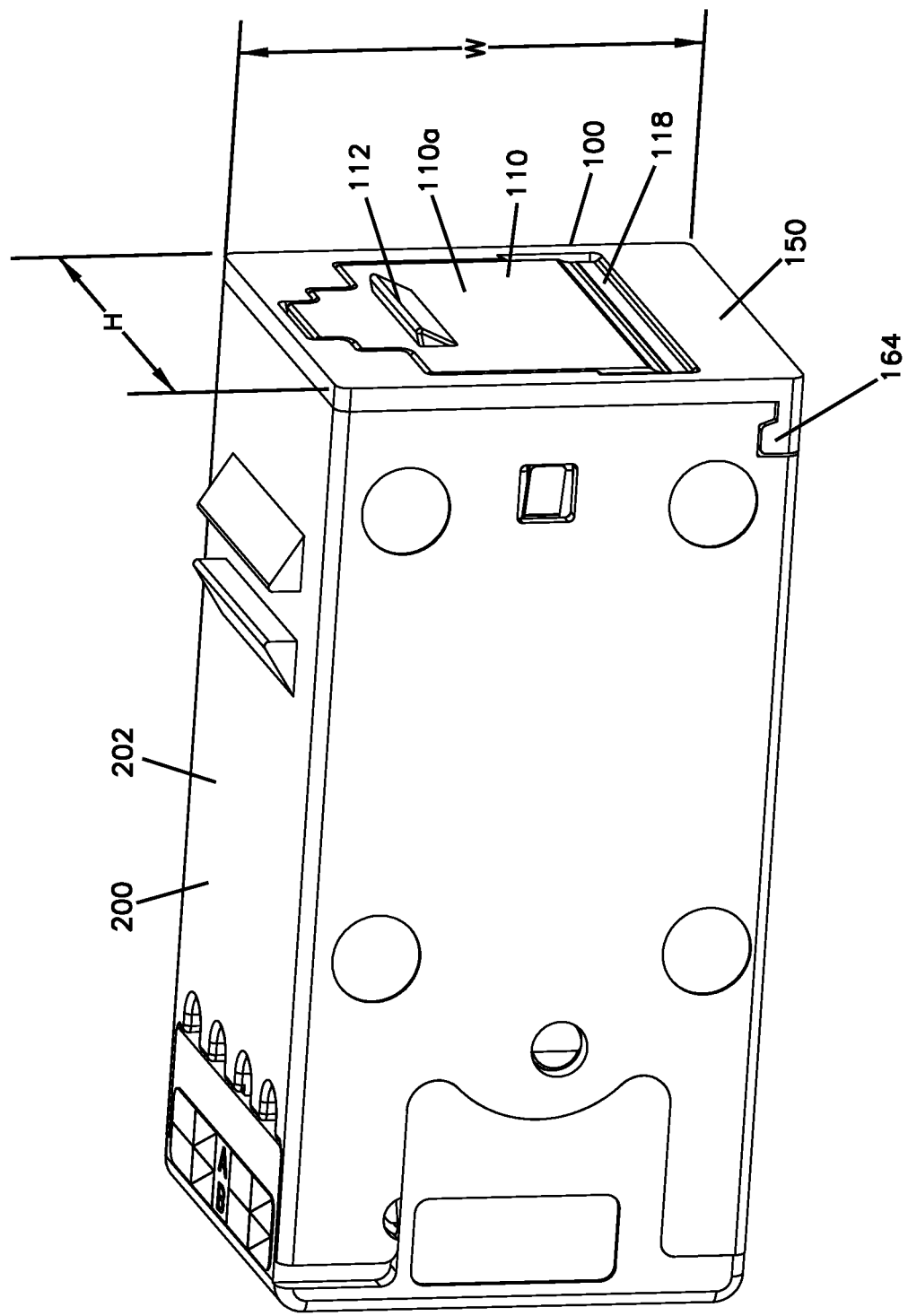
FIG. 2 is a front perspective view of the connector and cover assembly shown in FIG. 1, with the cover assembly shown as being mounted to the connector.
Figure 3:
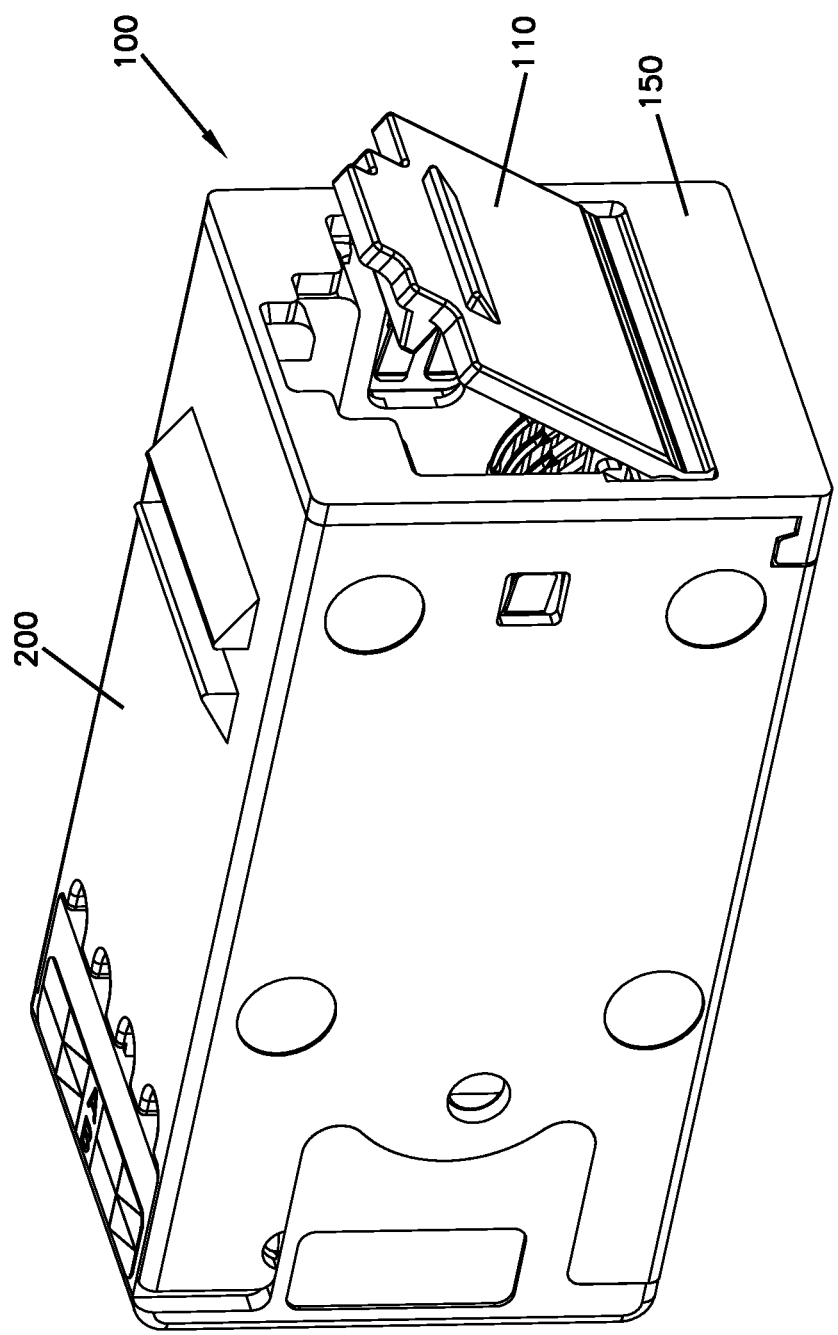
FIG. 3 is a front perspective view of the connector and cover assembly shown in FIG. 2, with the dust cap in a partially open position.
Figure 4:
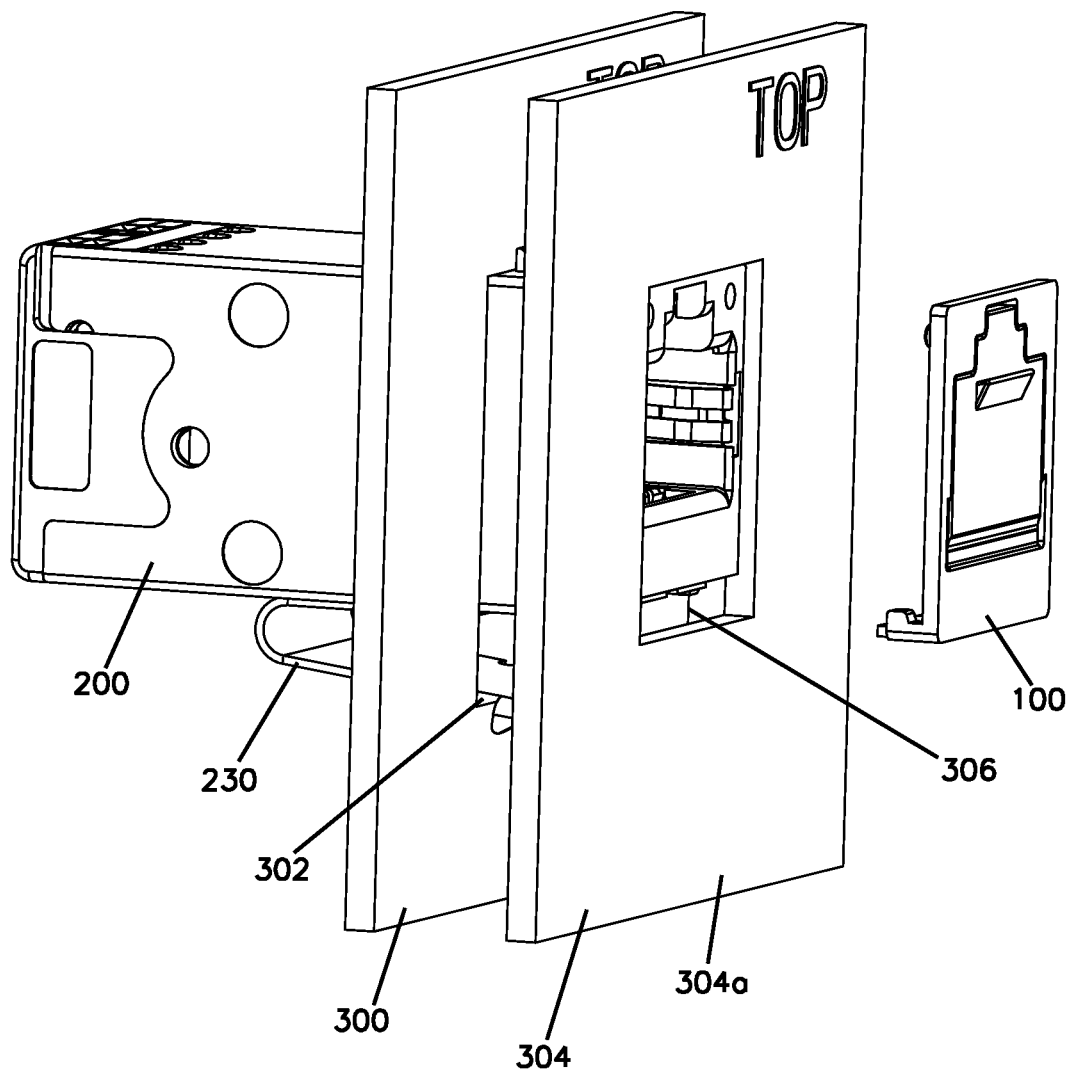
FIG. 4 is a front perspective view of the separated connector and cover assembly shown in FIG. 1, with the connector shown as being mounted to a mounting panel and a cover plate.
Figure 5:
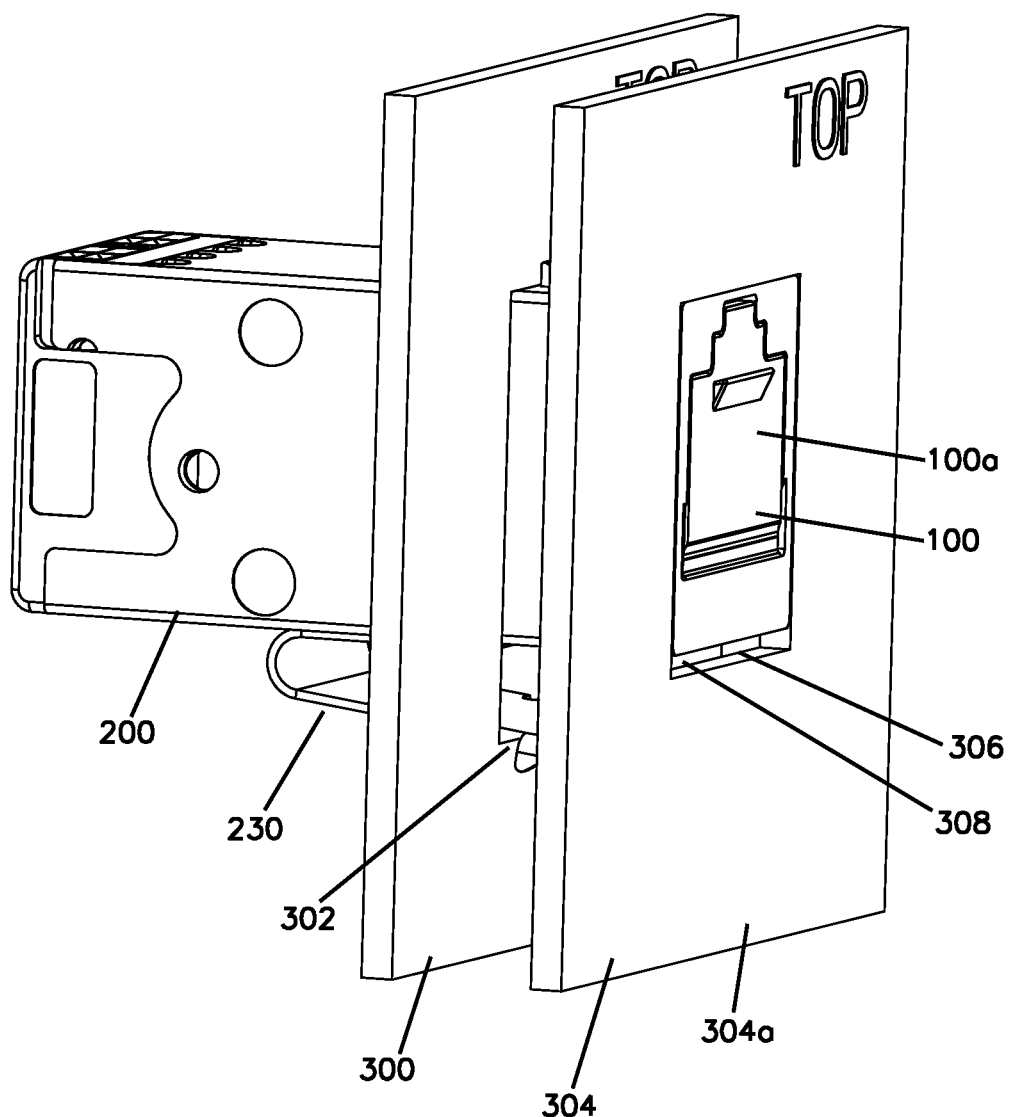
FIG. 5 is a front perspective view of the connector and cover assembly shown in FIG. 4, with the cover assembly shown as being mounted to the connector.

In the embodiment shown, the height H and width W of the base portion 150 and the height H and width W of the connector 200 are the same, as can be seen at FIGS. 2 and 3. This allows for the connector 200 to be installed into a mounting panel 300 and into a cover plate 304 with the cover assembly 100 already mounted to the connector 200. This mounted configuration is shown at FIG. 5, where it can be seen that the connector 200 is mounted through an opening 302 of the mounting panel 300 and is secured to the mounting panel 300 via a mounting clip 230 of the connector 200. The cover plate 304, which is typically mounted to a surrounding structure, also defines an opening 306 through which the cover assembly extends 100 such that the front face 110a of the cover assembly 100 and the front face 152a of the base portion are flush with a front face 304a of the cover plate 304. As also there is also a small clearance gap 308 between the bottom of the cover assembly 100/connector 200 and the opening 306, the cover assembly 100 can be easily removed from the connector 200 without requiring removal of the cover plate 304 or requiring removal of the connector 200 from the mounting panel 300. Likewise, the cover assembly 100 can be installed onto the connector 200 without requiring removal of the cover plate 304 or removal of the connector 200 from the mounting panel 300, as shown in FIGS. 4 and 5. This functionality represents a significant improvement over many prior art embodiments which cannot be replaced without removing the connector from the mounting panel and/or cover plate to facilitate replacement and over prior art embodiments which have dust covers or color caps that are larger than the body of the connector and can therefore prevent the connector from being able to be installed from either the rear or the front side of the mounting panel 300.

Figure 6:
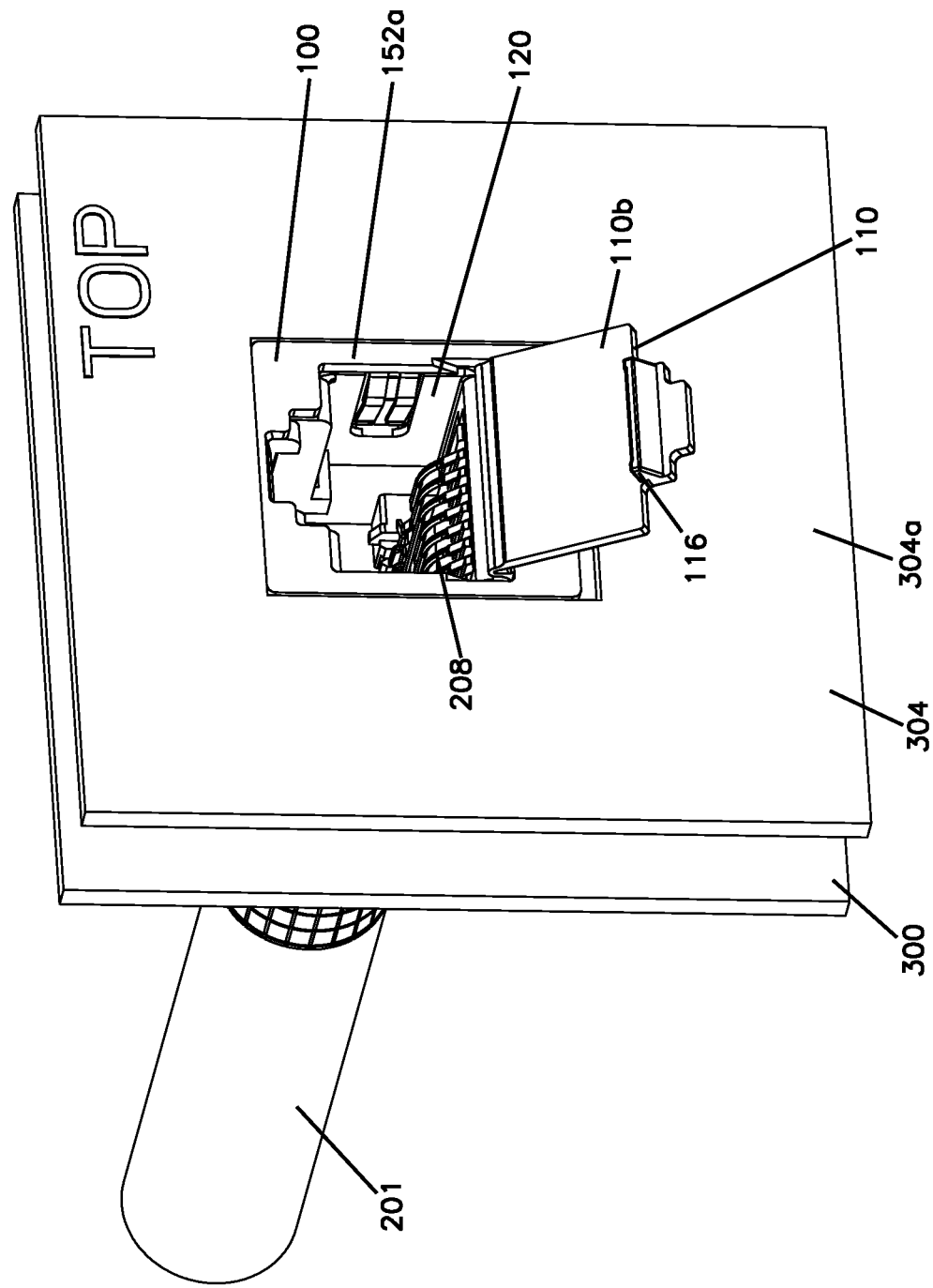
FIG. 6 is a front perspective view of the connector and cover assembly shown in FIG. 5, with the dust cap of the connector assembly being in an open position.
Figure 7:
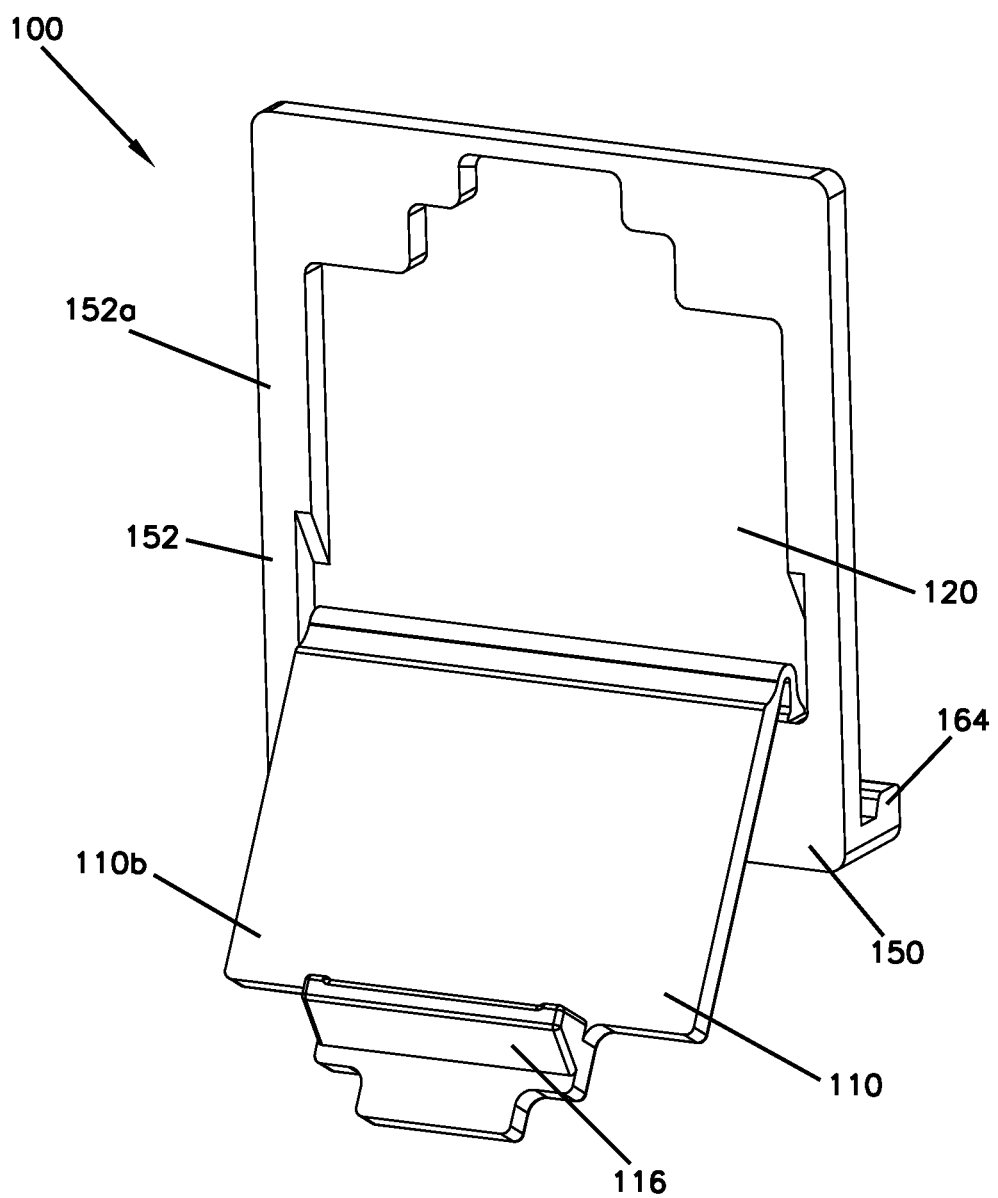
FIG. 7 is a front perspective view of the cover assembly shown in FIG. 1, with the dust cap shown being in a fully open position.
Figure 8:
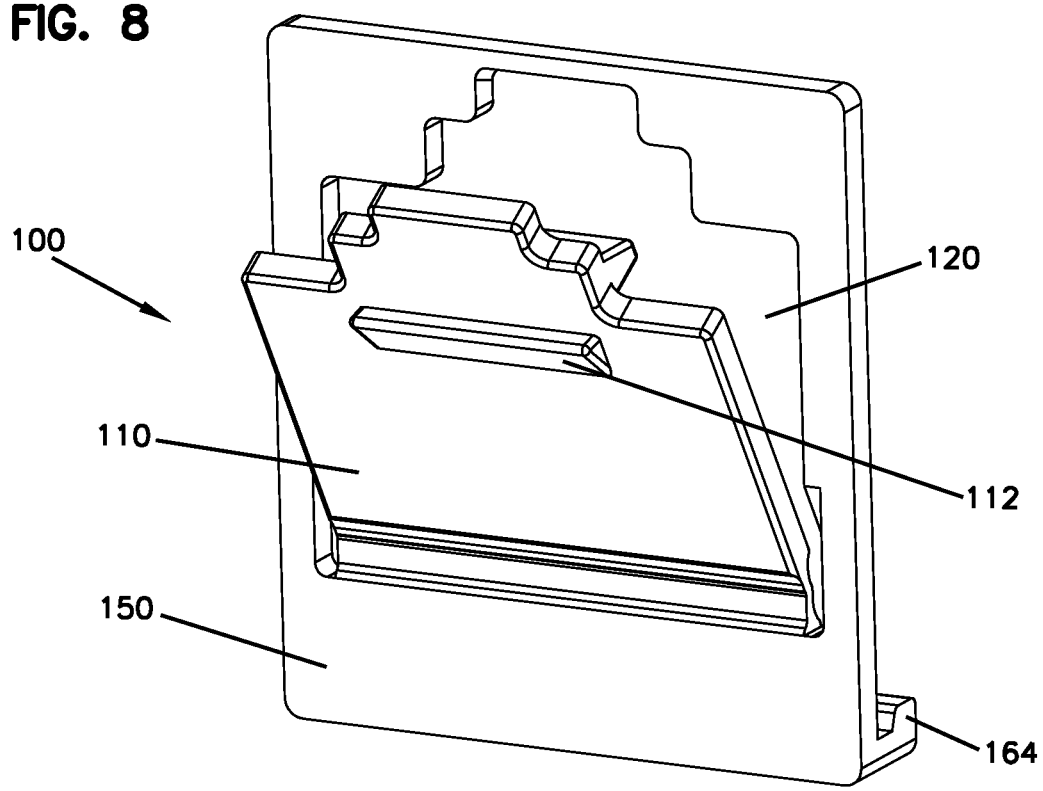
FIG. 8 is a front perspective view of the cover assembly shown in FIG. 1, with the dust cap shown being in a partially open position.
Figure 9:
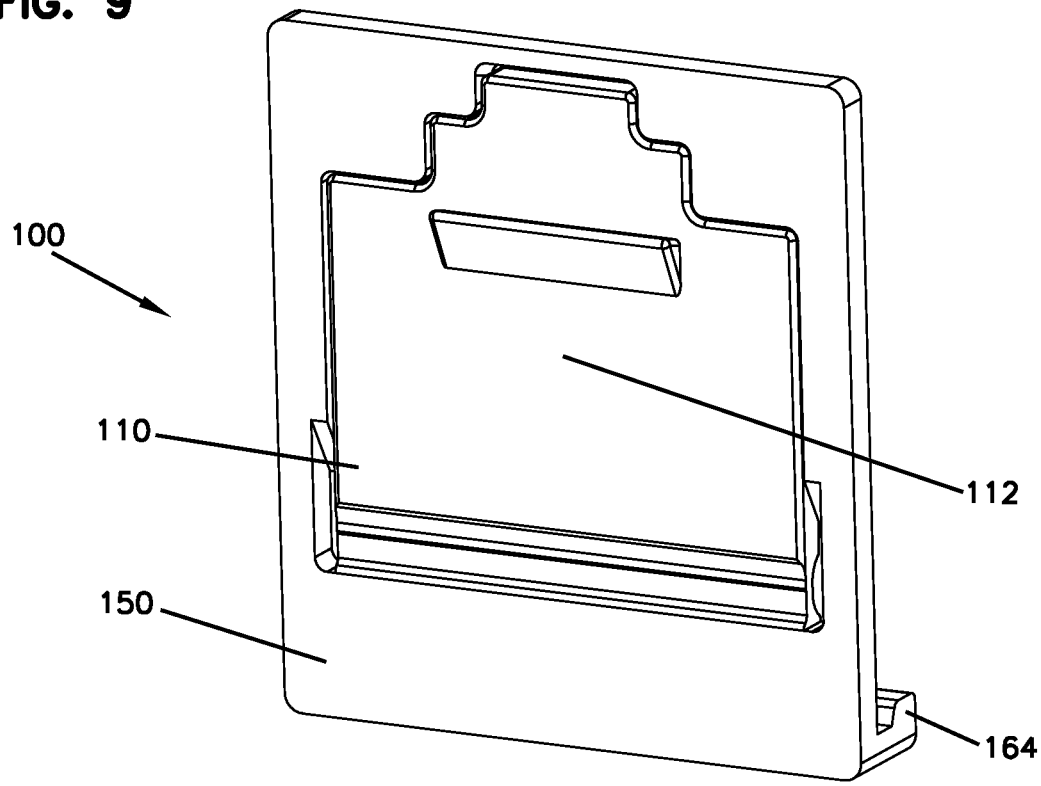
FIG. 9 is a front perspective view of the cover assembly shown in FIG. 1, with the dust cap shown being in a fully closed position.
Figure 10:
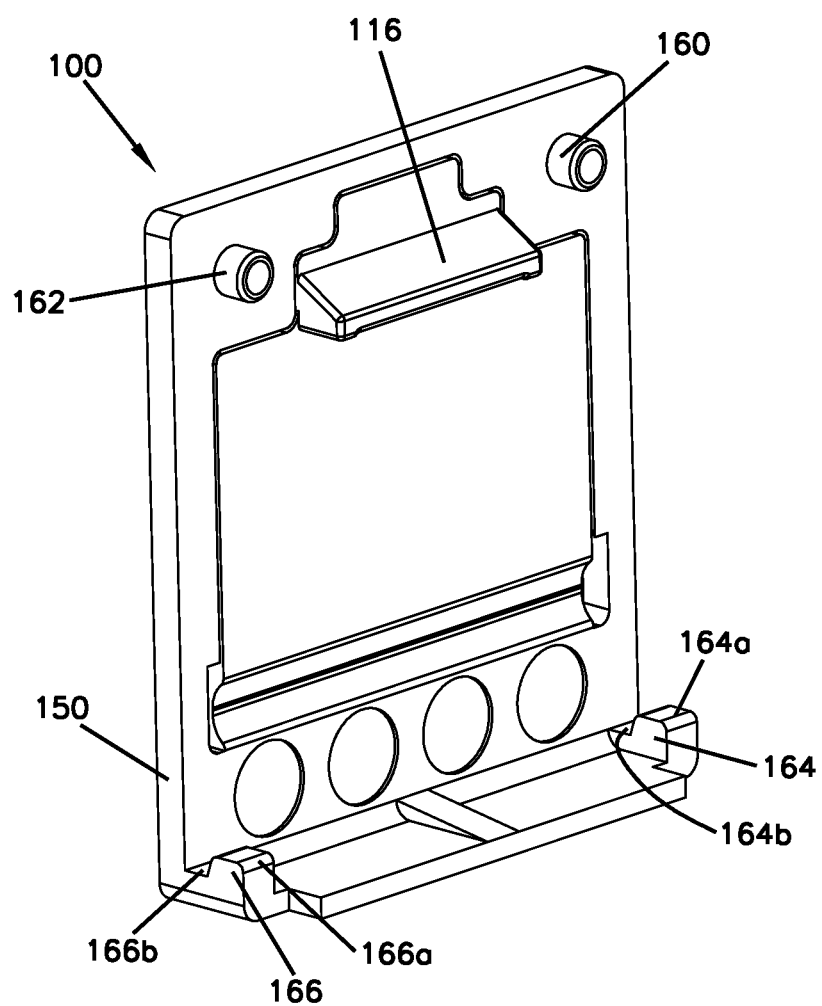
FIG. 10 is a rear perspective view of the cover assembly shown in FIG. 1, with the dust cap shown being in a fully closed position.
Figure 11:
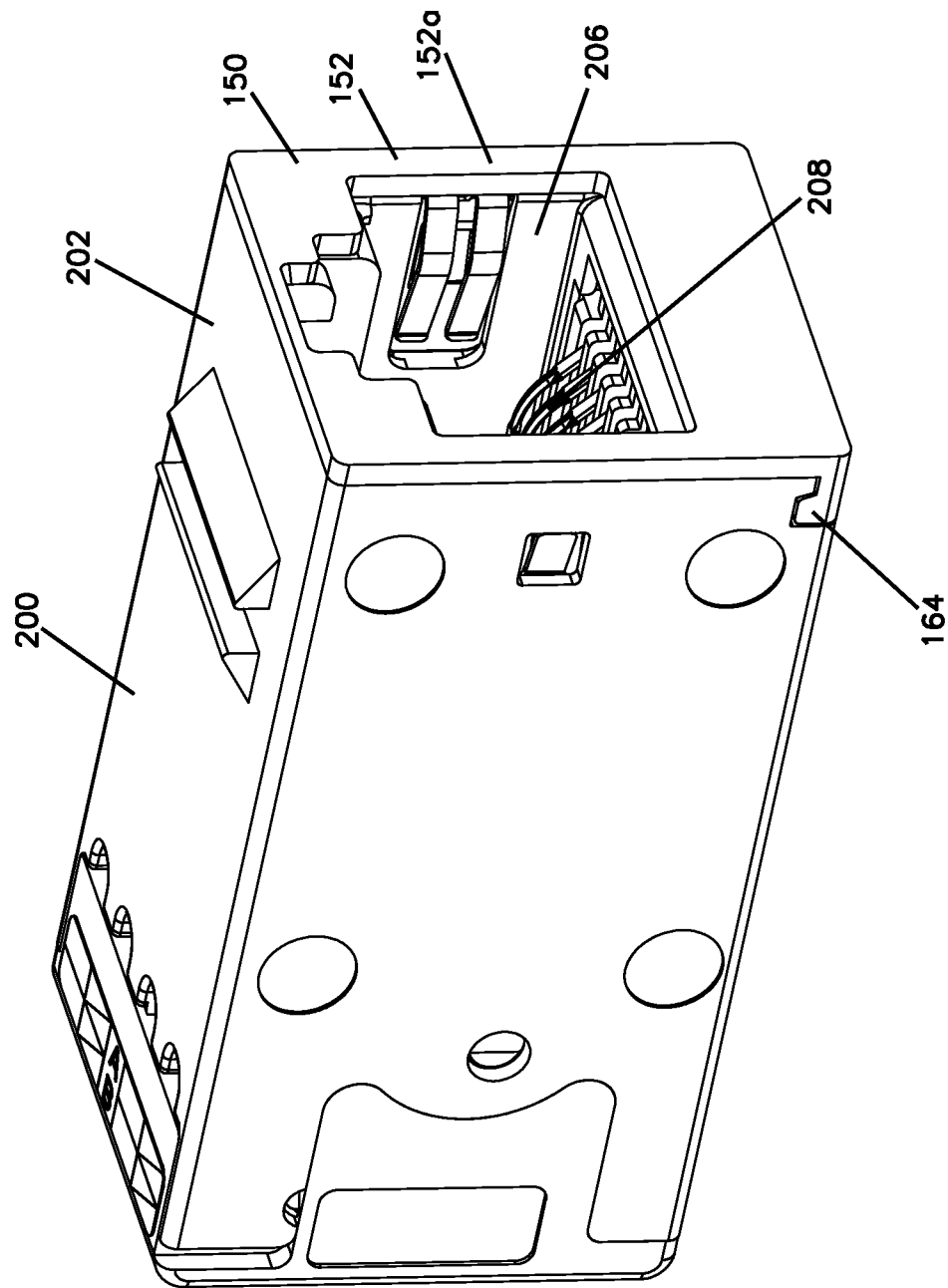
FIG. 11 is a front perspective view of a connector and a second embodiment of the cover assembly in which the cover portion is not provided, the cover assembly having features that are examples of aspects in accordance with the principles of the present disclosure.
Figure 12:
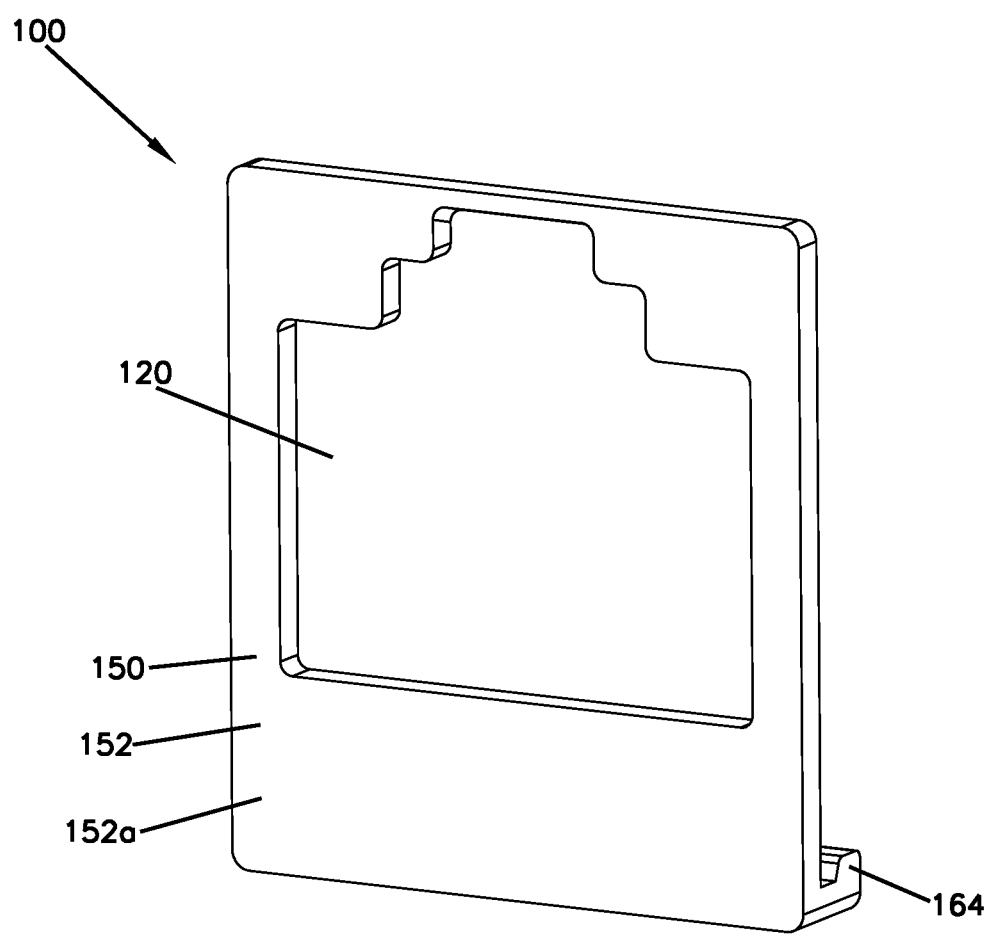
FIG. 12 is a front perspective view of the cover assembly shown in FIG. 11.
Figure 13:
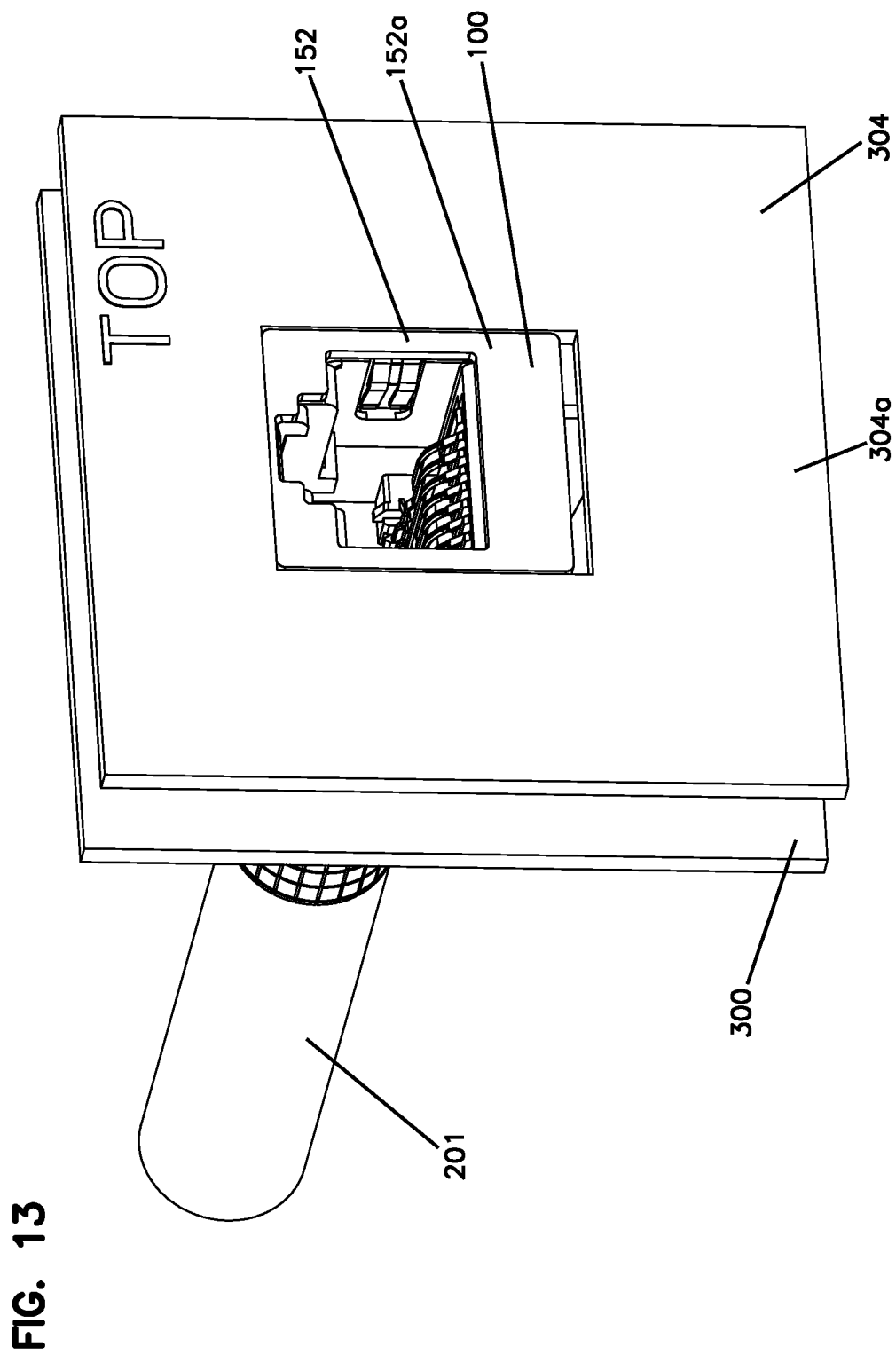
FIG. 13 is a front perspective view of the cover assembly shown in FIG. 11, with the connector shown as being mounted to a mounting panel and a cover plate.

In the embodiment shown, the rear face 152b has a surface area that is generally equal to the surface area defined by the front face 204 of the connector 200 (i.e. cover portion 110 and front face 204 have the same width and height H and W). As such, even when the cover portion 110 is moved to an open position, the base portion 150 remains visible to a user and unobscured by the cover portion 110, as can be seen at FIGS. 6 to 8. As such, the base portion 150 can be provided with a color (or other indicia) to function as a cap that provides a visual indication as to the connector identity or type. In some embodiments, the cover portion 110 is provided with the same color or indicia as the base portion 150, and can be integrally molded with the base portion 150 such that the cover assembly 100 is a formed as a single part. As such, the disclosed cover assembly 100 has the advantage of being an integrally formed, field replaceable unit that simultaneously serves as a dust cover and color cap. As shown at FIGS. 11-13, the cover assembly 100 can be provided without the cover portion 110 such that the cover assembly functions purely as a color cap.

In example embodiments, the components of the cover assembly 100 may be made of a plastic material, such as injection molded polyethylene and polypropylene. Other materials can be used.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

| PARTS LIST | |
|---|---|
| 100 | cover assembly |
| 110 | cover portion |
| 110a | front face |
| 110b | rear face |
| 112 | handle |
| 116 | securing feature |
| 118 | living hinge |
| 120 | opening |
| 150 | base portion |
| 152 | main body |
| 152a | front face |
| 152b | rear face |
| 160 | protrusion |
| 162 | protrusion |
| 164 | locking feature |
| 164a | lock portion |
| 164b | recess portion |
| 166 | locking feature |
| 166a | lock portion |
| 166b | recess portion |
| 200 | jack receptacle |
| 201 | cable |
| 202 | main body |
| 204 | front face |
| 206 | recess |
| 206a | sidewall |
| 206b | sidewall |
| 208 | contact springs |
| 220 | locking feature |
| 220a | lock portion |
| 220b | recess portion |
| 222 | locking feature |
| 222a | lock portion |
| 222b | recess portion |
| 224 | recess |
| 226 | recess |
| 230 | mounting clip |
| 300 | mounting panel |
| 302 | opening |
| 304 | cover plate |
| 304a | front face |
| 306 | opening |
| 308 | gap |
| H | height |
| W | width |

What is claimed is:

1. A cover assembly for covering a jack receptacle located at a front face of a telecommunications connector defining an outer perimeter, the cover assembly comprising:
    (a) a base portion including at least one attachment feature for securing the base portion to the front face of the telecommunications connector, the base portion having a front face that defines an opening located separately from all portions of the at least one attachment feature and generally matching that of a RJ-type receptacle opening and that defines an outer perimeter matching that of the telecommunications connector outer perimeter.

2. The cover assembly of claim 1, wherein the at least one attachment feature includes a first protrusion extending from a back face of the base portion that is configured to be received in a corresponding recess of the connector front face.

3. The cover assembly of claim 2, wherein the at least one attachment feature includes a second protrusion.

4. The cover assembly of claim 1, wherein the at least one attachment feature includes a first locking feature proximate an end of the base portion that is configured to engage with a corresponding connector locking feature of the connector.

5. The cover assembly of claim 4, wherein the at least one attachment feature includes a second locking feature.

6. The cover assembly of claim 2, wherein the at least one attachment feature includes a first locking feature proximate an end of the base portion that is configured to engage with a corresponding connector locking feature of the connector.

7. The cover assembly of claim 6, wherein the first locking feature is prevented from disengagement with the connector locking feature unless the first protrusion is removed from the connector recess.

8. A telecommunications connector assembly comprising:
a telecommunications connector including a jack receptacle located at a front face of a telecommunications connector;
a cover having a base portion attached to the telecommunications connector, the base portion having an opening at the location of the jack receptacle and having an outer perimeter generally matching an outer perimeter of the jack receptacle located at a second end opposite the front face, wherein the base portion has a height that is not more than a height of the connector front face and wherein the base portion has a width that is not more than a width of the front face of the telecommunications connector.

9. The telecommunications connector of claim 8, further comprising a cover portion connected to the base portion, the cover portion being movable between a closed position and an open position, wherein the cover portion includes a securing feature configured to engage with the jack receptacle to retain the cover portion in the closed position and wherein the front face of the cover portion includes a handle.

10. A telecommunications system comprising:
(a) a connector defining a jack receptacle located at a front face of the connector;
(b) a mounting panel to which the connector is mounted;
(c) a cover plate having a front face defining an opening, the cover plate being placed in a mounted position;
(d) a cover assembly removably secured to the connector and located at least partially within the cover plate opening, the cover assembly comprising:
i. a base portion including at least one attachment feature for securing the base portion to the front face of the connector, the base portion having a front face that defines an opening and that is coplanar with the cover plate front face, the front face of the base portion having an outer perimeter matching an outer perimeter defined by an end of the connector opposite the front face.

11. The telecommunications system of claim 10, wherein the cover assembly can be attached to and removed from the connector without removing the connector from the mounting panel.

12. The telecommunications system of claim 10, wherein the cover assembly can be attached to and removed from the connector without requiring removal of the cover plate from the mounted position.

13. The telecommunications system of claim 10, wherein the cover assembly can be attached to and removed from the connector without requiring removal of the cover plate from the mounted position and without removing the connector from the mounting panel.

14. The telecommunications system of claim 12, wherein the at least one attachment feature includes a first protrusion extending from a back face of the base portion that is configured to be received in a corresponding recess of the connector front face.

15. The telecommunications system of claim 14, wherein the at least one attachment feature includes a second protrusion.

16. The telecommunications system of claim 10, wherein the at least one attachment feature includes a first locking feature proximate an end of the base portion that is configured to engage with a corresponding connector locking feature of the connector.

17. The telecommunications system of claim 16, wherein the at least one attachment feature includes a second locking feature.

18. The telecommunications system of claim 14, wherein the at least one attachment feature includes a first locking feature proximate an end of the base portion that is configured to engage with a corresponding connector locking feature of the connector.

19. The telecommunications system of claim 18, wherein the first locking feature is prevented from disengagement with the connector locking feature unless the first protrusion is removed from the connector recess.

20. The telecommunications system of claim 10, wherein the base portion has a height that is not more than a height of the connector front face and wherein the base portion has a width that is not more than a width of the front face of the connector.

* * * * *